(12) United States Patent
Mont-Reynaud et al.

(10) Patent No.: US 11,151,329 B2
(45) Date of Patent: Oct. 19, 2021

(54) SUPPORT FOR GRAMMAR INFLECTIONS WITHIN A SOFTWARE DEVELOPMENT FRAMEWORK

(71) Applicant: SoundHound, Inc., Santa Clara, CA (US)

(72) Inventors: Bernard Mont-Reynaud, Sunnyvale, CA (US); Seth Taron, Sunnyvale, CA (US)

(73) Assignee: SoundHound, Inc., Santa Clara, CA (US)

(*) Notice: Subject to any disclaimer, the term of this patent is extended or adjusted under 35 U.S.C. 154(b) by 154 days.

(21) Appl. No.: 16/563,783

(22) Filed: Sep. 6, 2019

(65) Prior Publication Data

US 2021/0073333 A1    Mar. 11, 2021

(51) Int. Cl.
| | |
|---|---|
| *G06F 40/30* | (2020.01) |
| *G10L 15/197* | (2013.01) |
| *G06F 8/41* | (2018.01) |
| *G10L 15/18* | (2013.01) |
| *G06F 40/205* | (2020.01) |
| *G06F 40/253* | (2020.01) |

(52) U.S. Cl.
CPC .............. *G06F 40/30* (2020.01); *G06F 8/42* (2013.01); *G06F 40/205* (2020.01); *G06F 40/253* (2020.01); *G10L 15/1822* (2013.01); *G10L 15/197* (2013.01)

(58) Field of Classification Search
CPC ............................ G06F 16/3344; G06F 8/42
USPC ........................ 704/1, 9, 10, 257, 270–275
See application file for complete search history.

(56) References Cited

U.S. PATENT DOCUMENTS

| | | | |
|---|---|---|---|
| 2008/0306726 A1* | 12/2008 | Levy ...................... | G06F 40/55 704/2 |
| 2011/0035210 A1* | 2/2011 | Rosenfeld ............. | G06F 40/295 704/9 |
| 2012/0004903 A1* | 1/2012 | Pillai ..................... | G06Q 10/06 704/9 |
| 2014/0278427 A1* | 9/2014 | Riviere Escobedo .. | G10L 15/22 704/257 |
| 2016/0012033 A1* | 1/2016 | Craymer, III ......... | G06F 40/211 704/9 |

(Continued)

OTHER PUBLICATIONS

Porsteinsson et al. "A Wide-Coverage Context-Free Grammar for Icelandic and an Accompanying Parsing System". Proceedings of Recent Advances in Natural Language Processing, pp. 1397-1404, Varna, Bulgaria, Sep. 2-4, 2019 (Year: 2019).*

(Continued)

*Primary Examiner* — Jesse S Pullias
(74) *Attorney, Agent, or Firm* — Fenwick & West LLP

(57) ABSTRACT

A natural language understanding server includes grammars specified in a modified extended Backus-Naur form (ME-BNF) that includes an agglutination metasymbol not supported by conventional EBNF grammar parsers, as well as an agglutination preprocessor. The agglutination preprocessor applies one or more sets of agglutination rewrite rules to the MEBNF grammars, transforming them to EBNF grammars that can be processed by conventional EBNF grammar parsers. Permitting grammars to be specified in MEBNF form greatly simplifies the authoring and maintenance of grammars supporting inflected forms of words in the languages described by the grammars.

20 Claims, 3 Drawing Sheets

(56) References Cited

U.S. PATENT DOCUMENTS

2016/0042442 A1* 2/2016 Schoning .......... G06Q 30/0623
705/27.1

OTHER PUBLICATIONS

PJ, A. et al., "Computational Morphology and Natural Language Parsing for Indian Languages: A Literature Survey," International Journal of Computer Science & Engineering Technology, vol. 3, No. 4, Apr. 2012, pp. 136-146.

Sunil, R. et al., Morphological Analysis and Synthesis of Verbs in Malayalam, Centre for Development of Advanced Computing, ICTAM, Feb. 2012, 7 pages.

Zeman, D. "Morphological Analysis Context-Free Grammars," PowerPoint, http://ufal.mff.cuni.cz/course/npfl094, Nov. 19, 2010, 80 pages.

* cited by examiner

SUPPORT FOR GRAMMAR INFLECTIONS WITHIN A SOFTWARE DEVELOPMENT FRAMEWORK

TECHNICAL FIELD

The disclosed embodiments relate generally to natural language understanding (NLU) systems, and more specifically, to grammar extensions that simplify the drafting of grammars permitting inflected forms of words and phrases.

BACKGROUND

A natural language may include many different variants (hereinafter "inflections" or "inflected forms") of a single base word or phrase. For example, in English the base form of a noun (e.g., "penguin") may have inflected forms for possessives (e.g., "penguin's", as in "the penguin's natural habitat") or plurals (e.g., "penguins"). Similarly, in French the base form of verbs (e.g., "mange") may have relatively standard inflected forms for conjugations (e.g., "mange", "manges", "mange", "mangeons", "mangez", "mangent").

Software developers employing natural language understanding in their applications may write grammars that parser components use to determine whether a given natural language input conforms to the language specified by the grammar and/or what the meaning of the input is. Traditional language input processors depend on two separate components: a "tokenizer" that performs a lexical analysis of the input and outputs a sequence of "tokens" (which are word-level units); and a "parser" that performs a syntactic analysis of the token sequence, based in part on properties associated with the tokens. A typical tokenizer uses morphological rules that operate at the level of words in a lexicon, including word stems and word inflections. A typical parser is driven by a context-free or context-sensitive "phrase grammar" whose rules operate at the level of word sequences called phrases. Lexicons, morphological rules and grammar rules can be cumbersome to create and error-prone to use and maintain. The difficulty is compounded by the presence of inflections of words or phrases. Extending a given grammar to support inflections often requires duplication and modification of the relevant portions of the existing grammar—a process that can be error-prone and time-consuming. It would be useful if tools were available to simplify, and provide support for, the operations that specify inflected forms.

The figures depict various embodiments of the present invention for purposes of illustration only. One skilled in the art will readily recognize from the following description that other alternative embodiments of the structures and methods illustrated herein may be employed without departing from the principles of the invention described herein.

DETAILED DESCRIPTION

Figure 1:
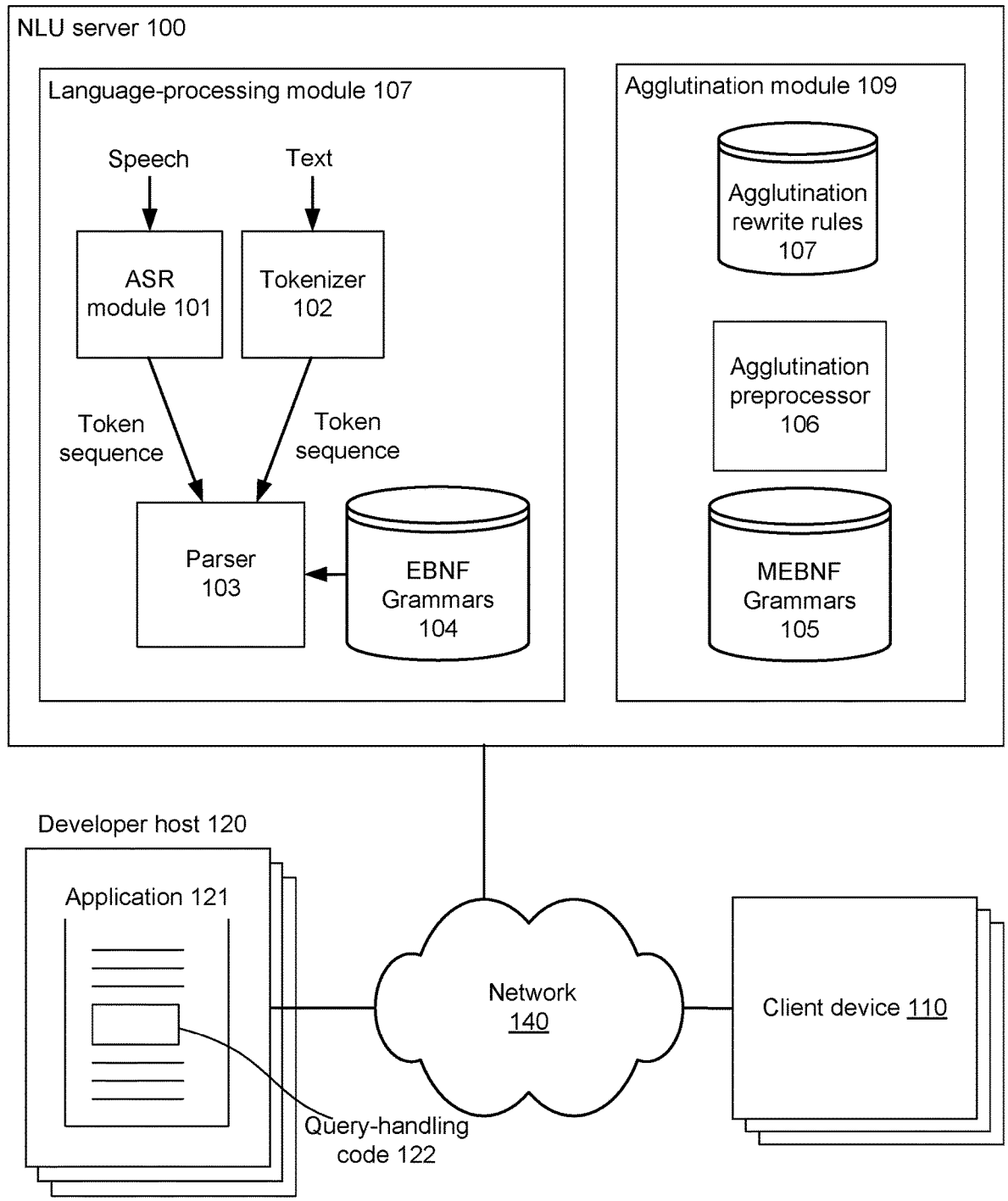
FIG. 1 shows a system environment in which natural language understanding, including inflection support, takes place, according to one embodiment.

FIG. 1 shows a system environment in which natural language understanding, including inflection support, takes place, according to one embodiment. Users of client devices 110 submit natural language queries to software applications 121 hosted on developer host systems 120, by way of a user interface that uses a microphone (for spoken queries), a keyboard (for written queries), or alternative ways of entering natural language input. The applications 121 delegate the analysis of the natural language queries to a NLU server 100. (In other embodiments not discussed hereinafter, the environment is not client-server based, but rather the functionality of the NLU server 100 may instead be incorporated into the developer host system 120 and/or the client devices 110. The techniques described herein pertaining to agglutination metasymbols, modified Extended Backus-Naur Form (MEBNF) grammars, and their processing, may be performed in any natural language understanding environment, and not only in the client-server based example described herein.)

More specifically, in the example of FIG. 1 the developer host systems 120 (e.g., web/application servers) provide the runtime environment for applications 121 (e.g., virtual assistants) developed by developers. A host system 120 is a computer system including one or more web servers, application servers, databases, and related computer hardware and software. The developers may administer the developer host systems 120, or the developer hosts may be administered by third parties.

Client devices 110 submit natural language queries from users for information to the applications 121. The various applications 121 can support natural language queries in any domain that the developers intend to support, each domain representing a particular area of information. For example, one developer can provide an application 121 supporting queries in the domain of geography/places, e.g., where the application 121 is configured to process natural language questions about populations and sizes of countries. As another example, another developer can provide an application 121 configured to process natural language queries in the domain of entertainment, e.g., responding to questions about particular movies, music, etc. As yet another example, another developer can provide an application configured to process natural language queries in the domain of geography, providing answers to questions regarding population, area, resources, or the like. Of course, a particular application 121 is not limited to a single domain, but rather may support queries in any number of domains. For example, a virtual assistant application may support queries in a large number of distinct domains, such as messaging, calendaring, task scheduling, and communications.

Since the developers of the applications 121 typically lack the considerable expertise required to properly configure an application 121 to process natural language queries, applications 121 are configured to make calls 122 (e.g., web service calls) that, in one embodiment, delegate the analysis of the natural language queries to the NLU server 100 by passing the natural language queries to the NLU server 100. The NLU server 100 then returns the results of the query interpretation to the application 121. For example, the user of the client device 110 might specify the query "What was the market cap of Apple in 1989 in Japanese yen?", which the application 121 would receive, transmitting the query to the NLU server 100; the query-processing server would then transmit the correct response to the application 121, which could present it to the client device 110.

The NLU server 100, the developer host system 120, and the systems of the client devices 110 may be implemented with various forms of hardware in different embodiments. Developer host systems 120 and client devices 110 communicate with the NLU server 100 through a network 140. The network may be any suitable communications network for data transmission. In one embodiment, the network 140 is the Internet and uses standard communications technologies and/or protocols.

Although the processing of the queries is described above, and throughout the below, as being implemented on the NLU server 100, it is appreciated that the logic for processing queries can be located elsewhere in other embodiments. For example, in one embodiment the query processing logic is implemented as a runtime library located directly on the developer host systems 120. In all embodiments, the query processing logic is a set of computer-implemented algorithms, as further described herein. Finally, as will be apparent from the following discussion, the algorithms and processes described herein require implementation on a computer system, and cannot be performed by humans using mental steps in any useful embodiment.

The NLU server 100 processes language in the form of speech or of text, or both, using a language-processing module 107. In FIG. 1, the language processing module 107 includes an automated speech recognition (ASR) module 101 for the processing of speech. Given a natural language input in speech form, the ASR module 101 processes the natural language input, and outputs a transcription in the form of a token sequence, such as perhaps ("the" "penguin" "lives" "in" "South Africa") for the speech input "The penguin lives in South Africa". The language processing module 107 may also accept text input and include a text tokenizer 102 for transforming a textual input into a sequence of tokens specifying speech components and their associated textual values. Tokens may have associated properties, such as in the sequence <type=Article, value="The">, <type=Noun, value="penguin">, <type=Verb, value="lives">, <type=Preposition, value="in">, <type=Noun, value="South Africa">.

The language processing module 107 also includes a parser module 103 that achieves understanding of the language input (e.g., to interpret what a natural language query is asking for) and to take an action in response (e.g., to obtain results that satisfy the query) by processing the token sequence generated by the ASR module 101 or the tokenizer 102

The parser module 103 that processes the sequence of tokens output by the ASR module 101 or the tokenizer module 102 in terms of one or more context-free Extended Backus-Naur Form (EBNF) grammars 104 (or the optimized runtime grammar 215 illustrated in FIG. 2, discussed below). The EBNF grammars 104 may be specified directly by a developer, or may be produced automatically from MEBNF grammars 105, as is described later below in the context of agglutination module 109. In some embodiments, the parser module 103 simply determines whether the sequence of tokens is grammatical according to the given grammar. In other embodiments, the parser module 103 specifies a meaning of the sequence of tokens by returning a data structure encoding the meaning; in such cases, the parser module 103 is referred to as a "semantic parser."

The NLU server 100 additionally includes an agglutination module 109 that runs at build time (that is, before the natural language input is processed by the language-processing module 107) and allows the authoring and use of richer grammars that facilitate the creation of inflected forms of words and phrases. In another embodiment, the agglutination module 109 could alternatively or additionally be part of the developer host 120, with the developer host 120 using it to create EBNF grammars from MEBNF grammars and providing the resulting EBNF grammars to the NLU server 100. The agglutination module 109 in turn includes an agglutination preprocessor 106 and agglutination rewrite rules 107 that operate together to convert MEBNF grammars 105 into EBNF grammars 104. These components are now discussed in more detail.

The MEBNF grammars 105 include—in addition to the standard metasymbols supported by EBNF, such as the '|' disjunction operator and the '*' and '+' iteration operators—a binary agglutination metasymbol not supported by EBNF. In the examples that follow, the agglutination metasymbol is represented by the ampersand character ('&'). The agglutination metasymbol has highest precedence. When used between two terminal symbols, it results in the string concatenation of the terminal symbols. Since string concatenation is used for building more complex strings out of simpler strings, the agglutination metasymbol is useful for constructing inflected forms of words and phrases by concatenating a prefix or suffix onto the base word or phrase. In regard to string concatenation, it is important to note that standard phrase grammars do not use the string concatenation operator. A phrase grammar rule such as "X→A B" always assumes a space between A and B. But a grammar using the agglutination operator supports the use of string concatenation in phrase grammars. The agglutination operator elegantly supports string concatenation in the parsing context, in which string concatenation is not traditionally supported.

Authors of a grammar for natural languages may wish to use different types of inflected forms, depending on which natural language the grammar is for (e.g., English or French), and which language features of the natural language are desired to be supported (e.g., possessives, plurals, articles, conjugations, or the like).

Since such MEBNF grammars use the agglutination metasymbol, which is not supported by EBNF, the agglutination module 109 follows agglutination rewrite rules 107 (e.g., hardcoded rules) that are used to transform the MEBNF grammars. Rewrite rules can be applied iteratively to remove all agglutination metasymbols, producing EBNF grammars that recognize the same "language" (i.e., set of possible strings) as the MEBNF grammars. The following sections provide sets of agglutination rewrite rules 107 for suffix inflections and for prefix inflections, described respectively by their rule sets below.

(A) Rewrite Rules for Suffixes:

Null Suffix Rewrite Rule: The empty string cannot have a suffix.

Rule: "" & t→""

where "" denotes the null string and t denotes a suffix.

Token Suffix Rewrite Rule: String terminals are simply concatenated.

Rule: s & t→concat(s, t)

where s and t are non-null non-terminals. For example, ("big" & "dogs") becomes "bigdogs".

Disjunction Suffix Rewrite Rule: The suffix is distributed across all the elements of the disjunction.

Rule: $(N_1|N_2| \ldots |N_K)$ & t→$((N_1$ & t)$|(N_2$ & t) $| \ldots | (N_K$ & t))

where $N_i$ denotes a non-terminal character, t denotes a suffix, and '|' is a metasymbol denoting disjunction.

For example, ("cat"|"dog") & "s"→("cats"|"dogs")

Option Suffix Rewrite Rule: Combining a suffix with an optional character results in their combination being optional.

Rule: [N] & t→[N & t]

where N denotes a non-terminal character, t denotes a suffix, and square brackets are a metasymbol denoting that the enclosed symbol is optional.

Sequence Suffix Rewrite Rule: A suffix, when combined with a sequence, is combined only with the final token in the sequence.

Rule: $(N_1 \ N_2 \ldots N_K)$ & t→$(N_1 \ N_2 \ldots N_K$ & t)

where $N_i$ denotes a non-terminal character and t denotes a suffix. For example, ("a" "wall" "clock") & "'s")→("a" "wall" ("clock" & "'s")). For example, ("big" "dog") & "s"→("big" "dogs").

Iteration Suffix Rewrite Rule: A suffix, when combined with a sequence, is combined only with the final token in the sequence.

Rule: (N* & t)→[N*N & t]

where N denotes a non-terminal character, t denotes a suffix, and '*' is a metasymbol denoting repetition of N zero or more times.

For example, ("dog"* & "s") becomes ["dog"* "dogs"].

(B) Rewrite Rules for Prefixes:

Null Prefix Rewrite Rule: The empty string cannot have a prefix.

Rule: t & ""→""

where "" denotes the null string and t denotes a suffix.

Token Prefix Rewrite Rule: String terminals are concatenated.

Rule: t & s→concat(t, s)

where s and t are non-null non-terminals, and concat(t, s) represents concatenation of the string values of t and s. For example, ("big" & "dogs") becomes "bigdogs". The prefix and suffix rules for token-token concatenation are actually identical.

Disjunction Prefix Rewrite Rule: The prefix is distributed across all the elements of the disjunction.

Rule: t & $(N_1|N_2| \ldots |N_K)$→((t & $N_1)|(t$ & $N_2)| \ldots | (t$ & $N_K))$ where $N_i$ denotes a non-terminal character, t denotes a suffix, and '|' is a metasymbol denoting disjunction.

For example, "l'" & ("arbre"|"opera") becomes ("l'arbre"|"l'opera")

Option Prefix Rewrite Rule: Combining a prefix with an optional character results in their combination being optional.

Rule: t & [N]→[t & N]

where N denotes a non-terminal character, t denotes a prefix, and square brackets are a metasymbol denoting that the enclosed symbol is optional.

Sequence Prefix Rewrite Rule: A prefix, when combined with a sequence, is combined only with the final token in the sequence.

Rule: t & $(N_1 \ N_2 \ldots N_K)$→(t & $N_1 \ N_2 \ldots N_K)$ where $N_i$ denotes a non-terminal character and t denotes a prefix.

For example, "l'" & ("arbre" "est" "beau") becomes ("l'arbre" "est" "beau").

Iteration Prefix Rewrite Rule: A prefix, when combined with a sequence, is combined only with the first token in the sequence.

Rule: (t & N*)→(t & N) N* where N denotes a non-terminal character, t denotes a suffix, and '*' is a metasymbol denoting repetition of N zero or more times.

The agglutination module 109 further includes an agglutination preprocessor module 106, which applies the agglutination rewrite rules 107 to the MEBNF grammars 105 so as to produce equivalent EBNF grammars 104. Two grammars are said to be "equivalent" if they recognize exactly the same set of sentences Accordingly, a grammar rewrite rule is said to "preserve the language" of the grammar to which it is applied if the grammar resulting from application of the rewrite rule is equivalent to the original grammar. All the grammar rewrite rules described here preserve the language of the original grammar. The application of the agglutination rewrite rules 107 gradually removes instances of the agglutination metasymbol until none are left. It can be proved that the set of rewrite rules is complete, that is, sufficient to remove all agglutination symbols.

The agglutination preprocessor module 106 can transform a given MEBNF grammar, G, into an equivalent EBNF grammar using the iterative algorithm below. To ensure simplicity of the code, the algorithm is stated in a non-deterministic manner, omitting technical details of an equivalent deterministic implementation. This is justified, because varying the order of application of the rule rewrites does not affect the final result. The algorithm follows:

```
repeat {
    find a rule R in grammar G whose RHS contains an agglutination
    metasymbol;
    find an agglutination rewrite rule applicable to the RHS;
    apply the agglutination rewrite rule to the RHS of R;
} until no agglutination symbol is left
```

Each application of an agglutination rewrite rule to a grammar rule R removes one instance of the agglutination metasymbol '&' from the right-hand side of R and adds zero or more other instances of '&' to the right-hand side of R. For instance, the prefix agglutination rewrite rule "(t & N*)→(t & N) N*" changes the RHS sequence "l" & ("arbre" "est" "beau") to ("l'arbre" "est" "beau"). It removes one instance of the agglutination metasymbol and adds another one, effectively moving the agglutination metasymbol further down into the expression. Similarly, a RHS with an alternation such as ("apple"|"orange"|"banana") & "s" rewrites it as ("apple" & "s"|"orange" & "s"|"banana" & "s") by application of the disjunction postfix rule, an RHS with three instances of "s", and three applications of the terminal rule will now produce ("apples"|"oranges"|"bananas"), leaving no instance of the agglutination metasymbol left. When no agglutination metasymbols remain in a rule, the agglutination preprocessor module 106 stops processing the rule. This process is applied to every rule in turn. When no agglutination metasymbols remain in the grammar, the grammar is now in EBNF form and can therefore be parsed by a conventional EBNF parsers. In some implementations, the EBNF grammar 204 that is the output of the agglutination preprocessor module 106 may be further transformed before it is used by a parser 103, typically to create an optimized runtime grammar 215.

The use of the prefix and suffix agglutination rewrite rules greatly simplifies the specification of a number of different types of inflected forms, such as English possessives, English plurals, French verb conjugation, French articles, and the like.

In practice, the agglutination technique is particularly useful for non-terminal symbols defined by large disjunctive rule sets, called "bundles," when they generate a large number of terminal symbols, and no non-terminal symbol. A bundle takes the form B→t$_1$|t$_2$| . . . |t$_N$ where t$_1$, t$_2$, . . . , t$_N$ are terminals. One example of a bundle is the rule NAMES→"Aaron"|"Adam"|Alice"|"Amber"|"Andrew"|"Andy"|"Anne"|"Barbara"|"Bernard"|
"Bill"|"Bob"|"Brenden"|"Charlie"|"Charlotte"|"Christopher"|"David"|"Darlene"|"Dawn"|"Dennis"|
"Dorothy"|"Elizabeth"|"Jonah"|"Jorge"|"Kyle"|"Laura"|"Morgan"|"Ramita"|"Rajendra"|"Richard"|
"Seth"| . . . "

Real-world examples might contain millions of names, for example. In this example, assume that the non-terminal NAMES is used in the rule LIKES→"I like" NAMES, so that valid strings in the language include "I like Adam" or "I like Amber". Further assume that the grammar author wishes to extend the LIKES grammar so that sentences can express their appreciation beyond persons to an object belonging to a named person, such as "I like Ramita's racquet"—that is, to support possessive inflected forms of names. The rule LIKES could then become "LIKES→"I like" (NAMES|(NAMES_POSSESSIVE OBJECT))".

It would be tedious and error-prone to create an explicit specification of the non-terminal NAMES_POSSESSIVE, such as "NAMES_POSSESSIVE→"Aaron's"|"Adam's"| Alice's"|"Amber's"|"Andrew's"|"Andy's"|"Anne's"| "Barbara's"|"Bernard's"|"Bill's"|"Bob's"|"Brenden's"| "Charlie's"|"Charlotte's"|"Christopher's"|"David's"| "Darlene's"|"Dawn's"|"Dennis's"|"Dorothy's"| "Elizabeth's"|"Jonah's"|"Jorge's"|"Kyle's"|"Laura's"| etc. . . . ". For example, a developer could inadvertently omit "Andy's" or type "Dennis" instead of "Dennis's" in the rule for NAMES_POSSESSIVE, causing parse errors that may remain undetected for a long time. In contrast, the use of the agglutination metasymbol lets the NAMES_POSSESSIVE rule be written simply NAMES_POSSESSIVE→ NAMES & "'s", which when processed by the agglutination preprocessor 106, results in the equivalent of the explicitly-specified rule above, with considerably less effort required, and a considerably lower probability of an inadvertent clerical error.

The same technique for agglutination of possessives can be applied to arbitrary enumerations of nouns. For example, the query pattern "what is the weather in" LOCATION can be extended by the query pattern "what is" LOCATION_POSS "weather" where the grammar specifies that LOCATION_POSS→LOCATION & "'s".

What is interesting about bundles is that they can be optimized at build time, if they are of sufficient size. At runtime, the parser, instead of trying to match each of the rules B→t$_1$, B→t$_2$, . . . , B→t$_N$ in turn against the next token, can match the token using an optimized data structure, such as a hash table or hashmap, that contains the entire set {t$_1$, t$_2$, . . . , t$_N$} of terminals in a form that makes matching easy. For example, a hash table or hashmap can replace a linear O(N) time factor by a constant O(1) time factor, where the Big-O notation indicates algorithm complexity. A hash table is used for a bundle membership test in a plain parser. A hashmap is used in a semantic parser, where each rule has a semantic augment.

The same optimization applies to agglutinations of bundles. Given a bundle B→t$_1$, B→t$_2$, . . . , B→t$_N$ (or equivalently B→t$_1$|t$_2$| . . . |t$_N$), B & t is also a bundle, as the disjunctive rewrite rule yields B&t→t$_1$&t, B&t→t$_2$&t, . . . , B&t→t$_N$&t, (or equivalently B&t→t$_1$&t |t$_2$&t| . . . |t$_N$&t). If the bundle optimization rule applies to a bundle B, creating a first hashmap H, the same optimization rule will apply to B&t, creating a new hashmap loosely called "H&t", for each terminal t encountered in the grammar. Hence, there is no explicit "bundle rewrite rule" but each combination of a bundle and agglutination will be specially processed. This was discussed for bundle suffixes B & t but applies equally to bundle prefixes s & B.

Figure 2:
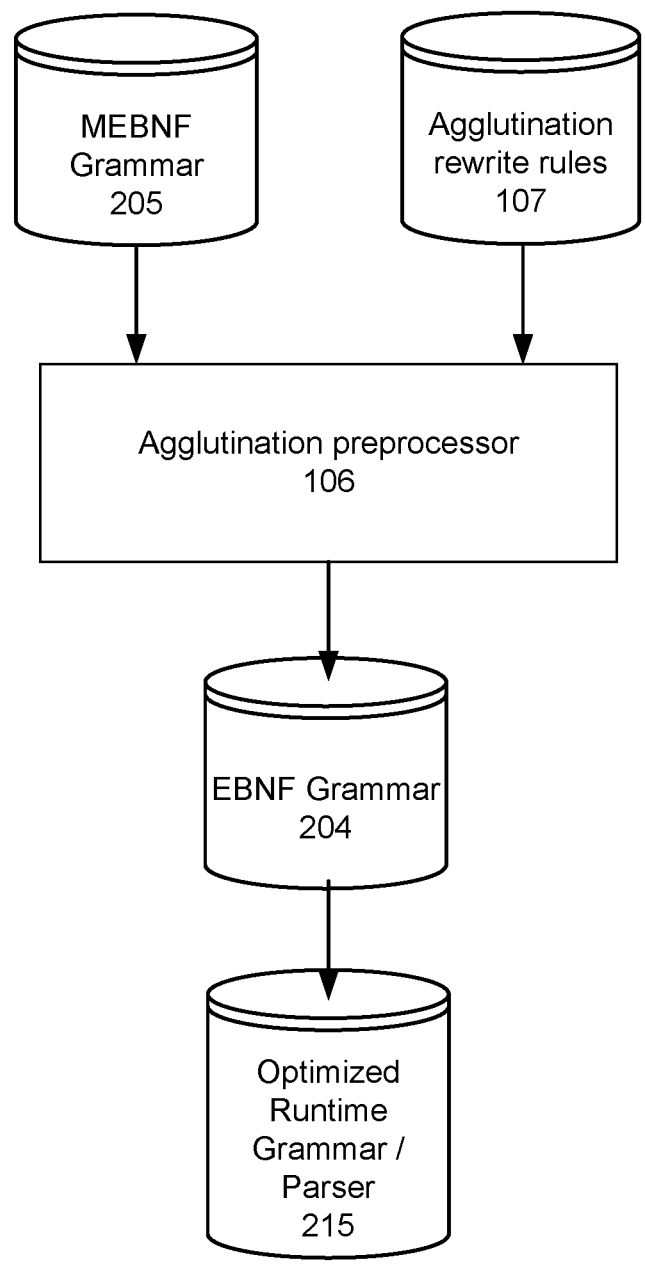
FIG. 2 illustrates the generation of runtime grammars, usable by the parser of FIG. 1, through use of the agglutination preprocessor and agglutination rewrite rules of FIG. 1, according to one embodiment.

FIG. 2 illustrates the generation of runtime grammars, usable by the parser of FIG. 1, through use of the agglutination preprocessor and agglutination rewrite rules of FIG. 1, according to one embodiment. The agglutination preprocessor 106 accepts as input an MEBNF grammar 205, along with the agglutination rewrite rules 107, outputting an EBNF grammar 204 that is equivalent to the MEBNF grammar 205, but without containing the agglutination metasymbol in any of its rules. In some embodiments, the agglutination module 109 further processes the EBNF grammar 204 to generate an optimized runtime grammar 215, which will run faster. One example of such an optimization is the bundle optimization described above. Many other techniques are known to optimize grammars for parsing.

In certain embodiments, a parsing algorithm and a grammar (such as the EBNF grammar 204) are "compiled" together into parser code that is no longer driven by the grammar (as an external data structure) but derived from the grammar (in the form of directly executable code—be that source code or object code.) In such embodiments, the optimized runtime grammar 215 becomes an optimized runtime parser 215, and the EBNF grammar 104 of FIG. 2 become integrated into parser module 103.

Example Computer Architecture

Figure 3:
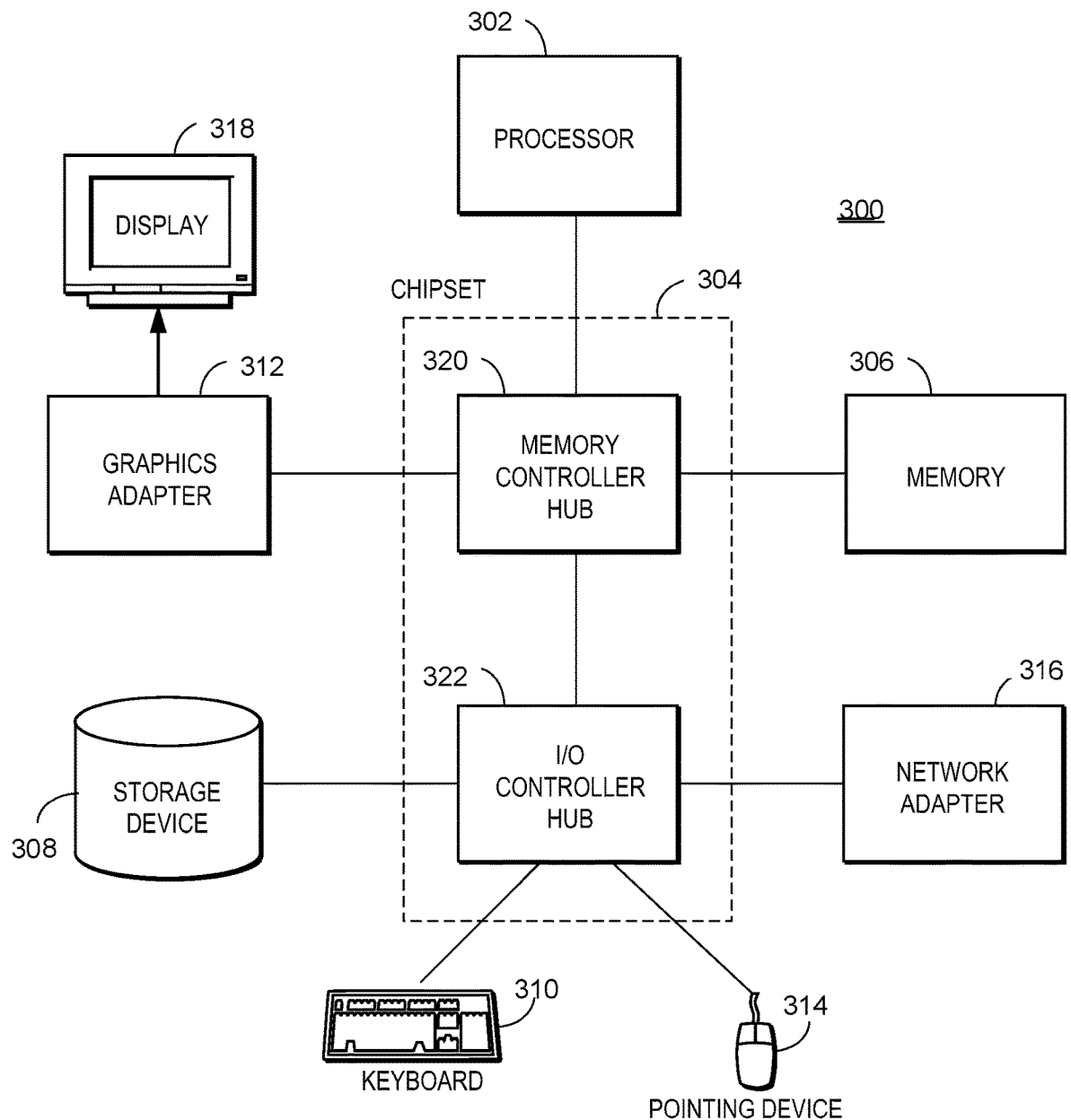
FIG. 3 is a high-level block diagram illustrating physical components of a computer used as part or all of the natural-language understanding server or client device or developer host systems of FIG. 1, according to one embodiment.

FIG. 3 is a high-level block diagram illustrating physical components of a computer 300 used as part or all of the NLU server 100, client device 110, or developer host system 120 from FIG. 1, according to one embodiment. Illustrated are at least one processor 302 coupled to a chipset 304. Also coupled to the chipset 304 are a memory 306, a storage device 308, a keyboard 310, a graphics adapter 312, a pointing device 314, and a network adapter 316. A display 318 is coupled to the graphics adapter 312. In one embodiment, the functionality of the chipset 304 is provided by a memory controller hub 320 and an I/O controller hub 322. In another embodiment, the memory 306 is coupled directly to the processor 302 instead of the chipset 304.

The storage device 308 is any non-transitory computer-readable storage medium, such as a hard drive, compact disk read-only memory (CD-ROM), DVD, or a solid-state memory device. The memory 306 holds instructions and data used by the processor 302. The pointing device 314 may be a mouse, track ball, or other type of pointing device, and is used in combination with the keyboard 310 to input data into the computer 300. The graphics adapter 312 displays images and other information on the display 318. The network adapter 316 couples the computer 300 to a local or wide area network.

As is known in the art, a computer 300 can have different and/or other components than those shown in FIG. 3. In addition, the computer 300 can lack certain illustrated components. In one embodiment, a computer 300 acting as a server may lack a keyboard 310, pointing device 314, graphics adapter 312, and/or display 318. Moreover, the storage device 308 can be local and/or remote from the computer 300 (such as embodied within a storage area network (SAN)).

As is known in the art, the computer 300 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 308, loaded into the memory 306, and executed by the processor 302.

Other Considerations

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment. The indefinite article "a" and "an" should be understood to include both the singular and the plural as appropriate for the context; thus "a block" should be understood for example to mean "at least one block".

It should be noted that the process steps and instructions are embodied in software, firmware or hardware, and when embodied in software, can be downloaded to reside on and be operated from different platforms used by a variety of operating systems.

The operations herein may also be performed by an apparatus. Furthermore, the computers referred to in the specification may include a single processor or may be architectures employing multiple processor designs for increased computing capability. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims below.

What is claimed is:

1. A computer-implemented method of transforming modified Extended Backus-Naur Form (MEBNF) phrase grammars, the computer-implemented method comprising:
   obtaining, from a software developer, a MEBNF grammar whose rules contain at least one agglutination metasymbol distinct from standard EBNF metasymbols;
   storing a plurality of agglutination rewrite rules, each agglutination rewrite rule when applied to a MEBNF expression producing a transformed MEBNF expression, while preserving the language generated by the MEBNF grammar;
   transforming the MEBNF grammar to an equivalent EBNF grammar by applying the agglutination rewrite rules to rules of the MEBNF grammar one or more times, wherein each application of an agglutination rewrite rule to a rule of the MEBNF grammar:
      removes an agglutination metasymbol from the grammar rule;
      adds zero or more agglutination metasymbols to the grammar rule;
   wherein the rules of the transformed MEBNF grammar no longer contain an agglutination metasymbol;
   receiving a natural language query of a user;
   parsing the natural language query using the equivalent EBNF grammar; and
   performing an action on behalf of the user based on a result of the parsing.

2. The computer-implemented method of claim 1, wherein the agglutination rewrite rules specify that the agglutination of two terminal strings is their string concatenation.

3. The computer-implemented method of claim 1, wherein all instances of an agglutination metasymbol in a rewrite rule are followed by a terminal suffix or preceded by a terminal prefix.

4. The computer-implemented method of claim 1, further comprising parsing the transformed MEBNF grammar with a conventional EBNF parser.

5. The computer-implemented method of claim 1, wherein the received rules of the MEBNF grammar specify possessive forms for nouns.

6. The computer-implemented method of claim 1, wherein the received rules of the MEBNF specify plurals for nouns.

7. The computer-implemented method of claim 1, wherein the received rules of the MEBNF specify conjugations of verbs.

8. The computer-implemented method of claim 1, wherein the received rules of the MEBNF specify prefix articles of nouns.

9. A non-transitory computer-readable storage medium storing executable program instructions that when executed by a computer processor perform actions comprising:
   obtaining, from a software developer, a modified Extended Backus-Naur Form (MEBNF) grammar whose rules contain at least one agglutination metasymbol distinct from standard EBNF metasymbols;
   storing a plurality of agglutination rewrite rules, each agglutination rewrite rule when applied to a MEBNF expression producing a transformed MEBNF expression, while preserving the language generated by the MEBNF grammar;
   transforming the MEBNF grammar to an equivalent EBNF grammar by applying the agglutination rewrite rules to rules of the MEBNF grammar one or more times, wherein each application of an agglutination rewrite rule to a rule of the MEBNF grammar:
      removes an agglutination metasymbol from the grammar rule;
      adds zero or more agglutination metasymbols to the grammar rule;
   wherein the rules of the transformed MEBNF grammar no longer contain an agglutination metasymbol;
   receiving a natural language query of a user;
   parsing the natural language query using the equivalent EBNF grammar; and
   performing an action on behalf of the user based on a result of the parsing.

10. The non-transitory computer-readable storage medium of claim 9, wherein the agglutination rewrite rules specify that the agglutination of two terminal strings is their string concatenation.

11. The non-transitory computer-readable storage medium of claim 9, wherein all instances of an agglutination metasymbol in a rewrite rule are followed by a terminal suffix or preceded by a terminal prefix.

12. The non-transitory computer-readable storage medium of claim 9, the actions further comprising parsing the transformed MEBNF grammar with a conventional EBNF parser.

13. The non-transitory computer-readable storage medium of claim 9, wherein the received rules of the MEBNF grammar specify possessive forms for nouns.

14. The non-transitory computer-readable storage medium of claim 9, wherein the received rules of the MEBNF specify plurals for nouns.

15. The non-transitory computer-readable storage medium of claim 9, wherein the received rules of the MEBNF specify conjugations of verbs.

16. The non-transitory computer-readable storage medium of claim 9, wherein the received rules of the MEBNF specify prefix articles of nouns.

17. A computer system comprising:
a computer processor; and
a non-transitory computer-readable storage medium storing executable program instructions that when executed by the computer processor perform actions comprising:
obtaining, from a software developer, a modified Extended Backus-Naur Form (MEBNF) grammar whose rules contain at least one agglutination metasymbol distinct from standard EBNF metasymbols;
storing a plurality of agglutination rewrite rules, each agglutination rewrite rule when applied to a MEBNF expression producing a transformed MEBNF expression, while preserving the language generated by the MEBNF grammar;
transforming the MEBNF grammar to an equivalent EBNF grammar by applying the agglutination rewrite rules to rules of the MEBNF grammar one or more times, wherein each application of an agglutination rewrite rule to a rule of the MEBNF grammar:
removes an agglutination metasymbol from the grammar rule;
adds zero or more agglutination metasymbols to the grammar rule;
wherein the rules of the transformed MEBNF grammar no longer contain an agglutination metasymbol;
receiving a natural language query of a user;
parsing the natural language query using the equivalent EBNF grammar; and
performing an action on behalf of the user based on a result of the parsing.

18. The computer system of claim 17, wherein the agglutination rewrite rules specify that the agglutination of two terminal strings is their string concatenation.

19. The computer system of claim 17, wherein all instances of an agglutination metasymbol in a rewrite rule are followed by a terminal suffix or preceded by a terminal prefix.

20. The computer system of claim 17, the actions further comprising parsing the transformed MEBNF grammar with a conventional EBNF parser.

* * * * *